(12) United States Patent
Maeda et al.

(10) Patent No.: US 12,474,259 B2
(45) Date of Patent: Nov. 18, 2025

(54) BIOLOGICAL INFORMATION DETECTION DEVICE AND BIOLOGICAL INFORMATION DETECTION METHOD

(71) Applicant: FUJITA MEDICAL INSTRUMENTS Co., Ltd., Tokyo (JP)

(72) Inventors: Hironobu Maeda, Tokyo (JP); Yoshihiro Yamaguchi, Tokyo (JP)

(73) Assignee: FUJITA MEDICAL INSTRUMENTS Co., Ltd., Tokyo (JP)

( * ) Notice: Subject to any disclaimer, the term of this patent is extended or adjusted under 35 U.S.C. 154(b) by 0 days.

(21) Appl. No.: 18/562,427

(22) PCT Filed: Aug. 9, 2022

(86) PCT No.: PCT/JP2022/030509
§ 371 (c)(1),
(2) Date: Nov. 20, 2023

(87) PCT Pub. No.: WO2024/034038
PCT Pub. Date: Feb. 15, 2024

(65) Prior Publication Data
US 2025/0020583 A1 Jan. 16, 2025

(51) Int. Cl.
*G01N 21/3577* (2014.01)
*G01N 21/85* (2006.01)
*G01N 33/487* (2006.01)

(52) U.S. Cl.
CPC ......... *G01N 21/3577* (2013.01); *G01N 21/85* (2013.01); *G01N 33/487* (2013.01); *G01N 2201/06113* (2013.01)

(58) Field of Classification Search
CPC .. G01N 21/3577; G01N 21/85; G01N 33/487; G01N 2201/06113; G01N 21/359;
(Continued)

(56) References Cited

U.S. PATENT DOCUMENTS 5,757,002 A 5/1998 Yamasaki et al.
2007/0115475 A1* 5/2007 Shpantzer ............ G01N 21/171
356/451
(Continued)

FOREIGN PATENT DOCUMENTS

JP H09-126995 A 5/1997
JP 2002-165797 A 6/2002
(Continued)

OTHER PUBLICATIONS

European Extended Search Report issued Dec. 19, 2024 in Application No. 22940935.4.
(Continued)

*Primary Examiner* — Kiho Kim
(74) *Attorney, Agent, or Firm* — Faegre Drinker Biddle & Reath LLP

(57) ABSTRACT

The present invention is a biological information detection device including: a laser oscillator that oscillates a pulsed laser beam oscillated at a suitable wavelength associated with a measuring target substance; an irradiation mechanism that emits the pulsed laser beam to a liquid biological object inside which the measuring target substance exists; a light receiving sensor that receives a detected laser beam output from the liquid biological object; and a control unit that controls operations of respective components. The control unit outputs an oscillation instruction to the laser oscillator so as to oscillate the pulsed laser beam at a constant cycle, cuts out a detected signal received from the light receiving sensor as time segment data for a time period corresponding to the constant cycle, and calculates a quantity of the measuring target substance in the liquid biological object based on the time segment data.

8 Claims, 10 Drawing Sheets

(58) Field of Classification Search
CPC .......... G01N 2201/0697; A61B 5/0062; A61B 5/0075; A61B 5/14546; A61B 5/1455
See application file for complete search history.

(56) References Cited

U.S. PATENT DOCUMENTS

| | | |
|---|---|---|
| 2010/0324398 A1 | 12/2010 | Tzyy-Ping |
| 2020/0069225 A1 | 3/2020 | Vizbaras et al. |
| 2021/0325246 A1 | 10/2021 | Fujii et al. |
| 2021/0361202 A1 | 11/2021 | Horie |
| 2023/0355142 A1 | 11/2023 | Yamakawa et al. |

FOREIGN PATENT DOCUMENTS

| | | |
|---|---|---|
| JP | 2002-168862 A | 6/2002 |
| JP | 2010-125147 A | 6/2010 |
| JP | 2010-526646 A | 8/2010 |
| JP | 2020-520768 A | 7/2020 |
| JP | 2021-180796 A | 11/2021 |
| WO | WO-2022/071442 A1 | 4/2022 |

OTHER PUBLICATIONS

European Communication pursuant to Article 94(3) EPC issued Aug. 18, 2025 in Application No. 22940935.4.

\* cited by examiner

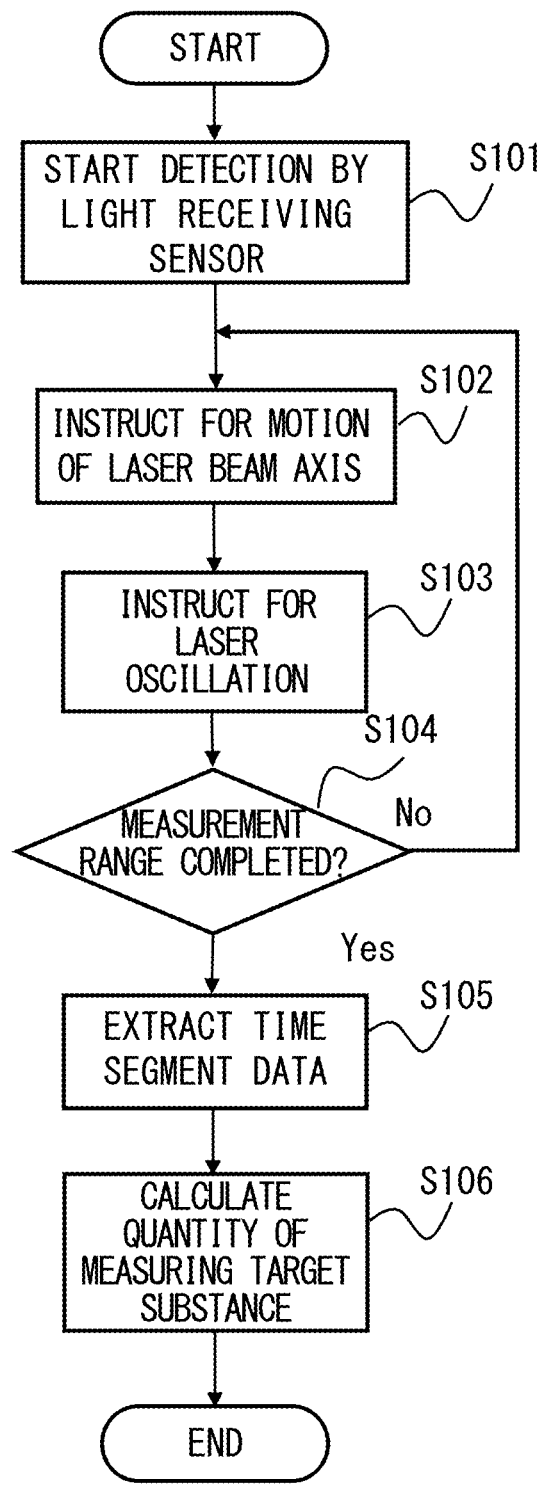

BIOLOGICAL INFORMATION DETECTION DEVICE AND BIOLOGICAL INFORMATION DETECTION METHOD

CROSS REFERENCE TO PRIOR APPLICATIONS

This application is the National Stage of International Application No. PCT/JP2022/030509 filed Aug. 9, 2022, which is herein incorporated by reference in its entirety.

TECHNICAL FIELD

The present invention relates to a biological information detection device and a biological information detection method, in particular, relates to a biological information detection device and a biological information detection method for acquiring a quantity of a measuring target substance existing in a liquid biological object.

BACKGROUND ART

Lactic acids contained in human blood are produced in a large amount when sugar in the blood is metabolized in an anoxic state during strenuous exercise or the like, for example. The concentration of such lactic acids in blood is applied for an index of a state of shock or a circulatory failure, for example, as a value indicating the degree of blood circulation.

As an example of the above, with respect to sepsis that causes damage to organs of the whole body due to contamination of bacteria or the like into blood, when performing postoperative management of a patient who have undergone surgery or when transporting an emergency patient showing a symptom of shock, it is possible to determine whether or not the symptom of the patient becomes severe by monitoring the concentration of lactic acids in the blood. While measurement of such a concentration of lactic acids in blood is performed by analyzing of blood collected from the patient in general, simple and continuous measurement is difficult, and risk management against infection diseases that may be caused by such blood collection is essential.

As one countermeasure in this respect, for example, Patent Literature 1 discloses a method of estimating the concentration level of blood analytes of a patient, and the method includes: receiving a first set of input variables that include no invasively measured variable and in which at least one first variable of the first set of input variables is affected by the concentration level of the blood analytes of the patient and at least one second variable of the first set of input variables is not affected by the concentration level of the blood analytes of the patient; pre-processing at least one of the first set of input variables to generate a second set of variables; and applying a linear separation method to the second set of variables to generate a third set of variables. According to this method, since the method enables completely noninvasive measurement and is relatively insensitive to fluctuating patient and environment conditions, it could be possible to more accurately characterize physiological parameters and perform reliable characteristic determination in a broader range of applications.

Further, Patent Literature 2 discloses a method of monitoring a blood component level of a subject in real time, and the method includes steps of: providing a system-on-chip having a wavelength-tunable hybrid III-V/IV laser sensor; instructing the system-on-chip to monitor the blood component level of the subject by transmitting a sweep laser signal to an optical fiber interface; directing the signal to blood of the subject by the optical fiber interface; collecting reflected signals from the blood by the optical fiber interface after the signal interacts with the blood; and directing the reflected signals to a reflected light photodiode. In these processes, the reflected signal is an optical signal; and steps of converting the reflected signal from an optical signal into an electrical signal; and converting the electrical signal into a calibrated blood component level by processing the electrical signal using a microcontroller are performed. This makes it possible to continuously collect a plurality of data points over a certain period and thereby provide important information on a history trend that may be important in evaluating effectiveness of treatment.

CITATION LIST

Patent Literature

Patent Literature 1: Japanese Patent Application Laid-Open No. 2010-526646
Patent Literature 2: Japanese Patent Application Laid-Open No. 2020-520768

SUMMARY OF INVENTION

Technical Problem

In the conventional arts described above as an example, in the method disclosed in Patent Literature 1, for example, although the first set of input variables in blood are acquired noninvasively (see the passage "include no invasively measured variable"), it is required to receive at least two variables, namely, the first variable that "is affected" by a concentration level of blood analytes and the second variable that "is not affected" by the same. Thus, there is a problem of an increased amount of data in continuously monitoring the condition of a patient and performing data processing thereon.

On the other hand, in the method disclosed in Patent Literature 2, it is possible to noninvasively acquire component data of target blood by irradiating an output beam onto the blood flowing through blood vessels within a skin and receiving a reflected beam thereof by a photodiode. When data is noninvasively acquired from outside of a human body, however, the reflected beam can include, as noise, a light component based on a measurement environment (for example, natural light, illumination light, or the like) other than the reflected component of the output beam, because a laser sensor and a target human body are not in contact with each other, and this will be one of the factors that may lower calculation accuracy on the blood components.

In view of such circumstances, the present application intends to provide a biological information detection device and a biological information detection method that can acquire measurement data on a measuring target substance contained in a liquid biological object noninvasively with low noise.

Solution to Problem

A biological information detection device according to one aspect of the present invention including: a laser oscillator that oscillates a pulsed laser beam oscillated at a suitable wavelength associated with a measuring target substance; an irradiation mechanism that emits the pulsed laser beam to a liquid biological object inside which the measuring target substance exists; a light receiving sensor that receives a detected laser beam output from the liquid biological object; and a control unit that controls operations of respective components, and is configured such that the control unit outputs an oscillation instruction to the laser oscillator so as to oscillate the pulsed laser beam at a constant cycle, cuts out a detected signal received from the light receiving sensor as time segment data for a time period corresponding to the constant cycle, and calculates a quantity of the measuring target substance in the liquid biological object based on the time segment data.

Further, a biological information detection method according to another aspect of the present invention including: emitting a pulsed laser beam oscillated at a suitable wavelength associated with a measuring target substance to a liquid biological object inside which the measuring target substance exists; and receiving a detected laser beam output from the liquid biological object to acquire a quantity of the measuring target substance in the liquid biological object is configured such that the pulsed laser beam is oscillated at a constant cycle and so as to include cutting out a detected signal received from the light receiving sensor as a time segment data for a time period corresponding to the constant cycle and calculating the quantity of the measuring target substance based on the time segment data.

Advantageous Effects of Invention

According to one aspect of the present invention, since the invention is configured to output an oscillation instruction to a laser oscillator so as to oscillate a pulsed laser beam at a constant cycle, cut out a detected signal received from a light receiving sensor as time segment data in a time period corresponding to the constant cycle, and calculate the quantity of a measuring target substance in a liquid biological object based on the time segment data, measurement data on the measuring target substance contained in the liquid biological object can be acquired noninvasively with low noise.

BRIEF DESCRIPTION OF DRAWINGS

FIG. 4 is a flowchart illustrating an overview of a biological information detection method according to the first embodiment.

DESCRIPTION OF EMBODIMENTS

Embodiments of the biological information detection device and the biological information detection method according to representative examples of the present invention will be described below with reference to the drawings.

Note that, in this specification, the term "liquid biological object" means a liquid object or a secretion produced in the human body, such as blood, sweat, or lymph fluid, for example. Further, as the term "measuring target substance", a molecular compound or the like other than moisture contained in the above liquid biological object can be indicated as examples.

First Embodiment

Figure 1:
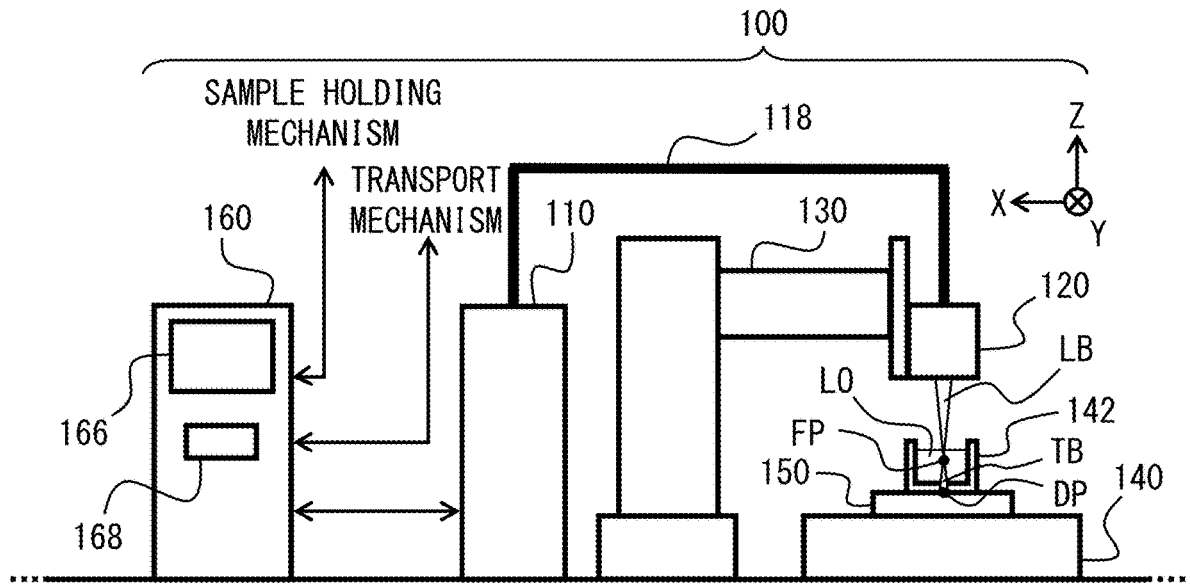
FIG. 1 is a schematic diagram illustrating a configuration of a biological information detection device according to a first embodiment that is a representative example of the present invention.
Figure 2:
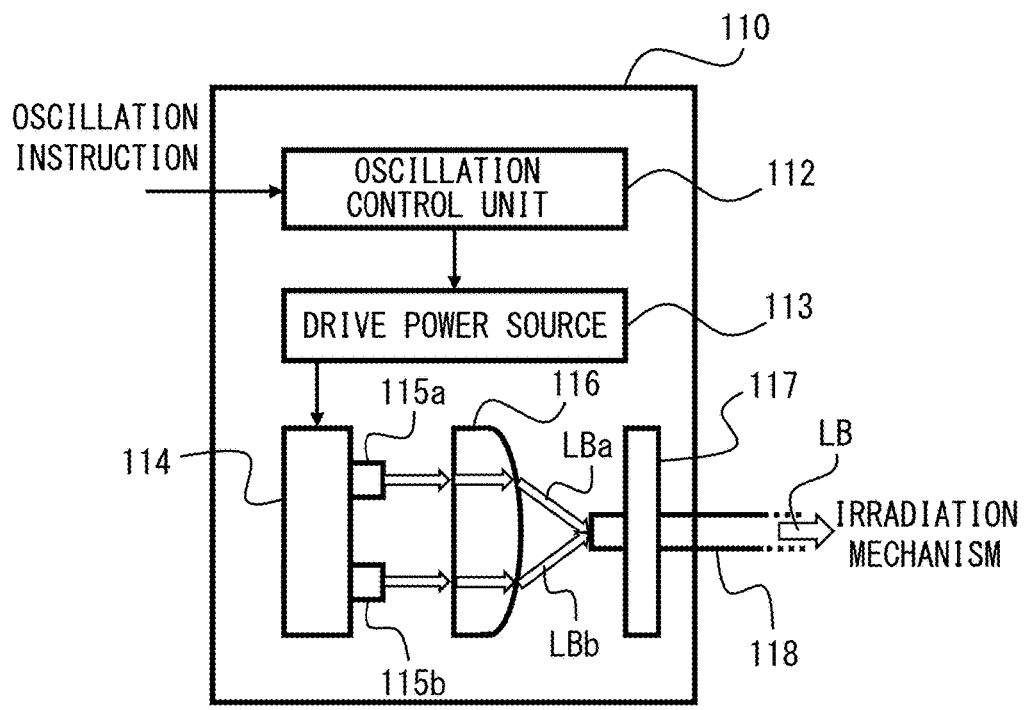
FIG. 2 is a block diagram illustrating an example of a configuration of a laser oscillator included in the biological information detection device illustrated in FIG. 1.
Figure 3:
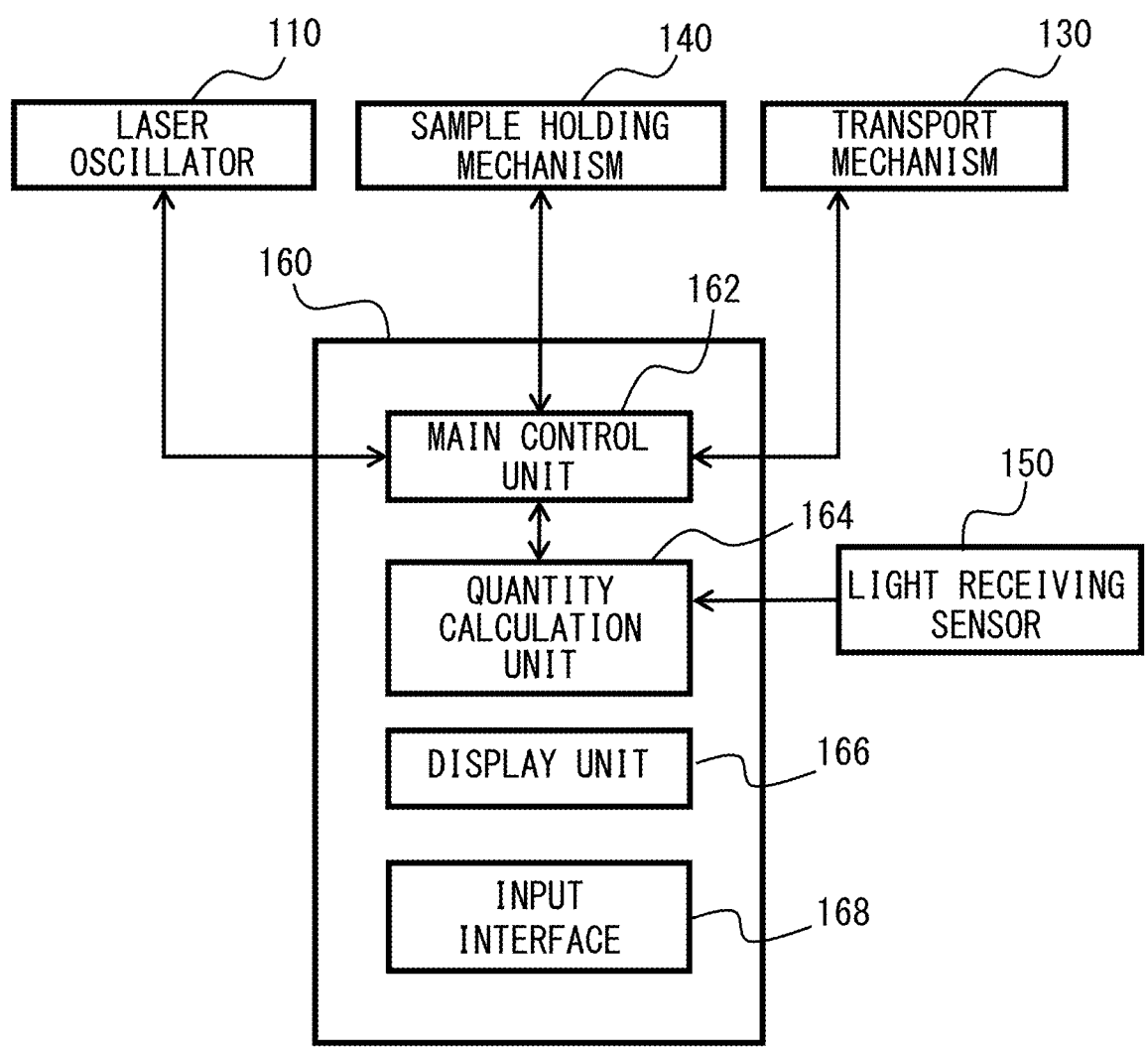
FIG. 3 is a block diagram illustrating an example of a configuration of a control unit included in the biological information detection device illustrated in FIG. 1.

FIG. 1 is a schematic diagram illustrating a configuration of a biological information detection device according to a first embodiment that is a representative example of the present invention. Further, FIG. 2 is a block diagram illustrating an example of a configuration of a laser oscillator included in the biological information detection device illustrated in FIG. 1. Further, FIG. 3 is a block diagram illustrating an example of a configuration of a control unit included in the biological information detection device illustrated in FIG. 1.

As illustrated in FIG. 1, a biological information detection device 100 according to the first embodiment includes, as an example thereof, a laser oscillator 110 that oscillates a pulsed laser beam LB oscillated at a suitable wavelength associated with a measuring target substance, an irradiation mechanism 120 that emits the pulsed laser beam LB to a liquid biological object LO inside which the measuring target substance exists, a transport mechanism 130 that moves positions in X, Y, and Z directions of the irradiation mechanism 120, a sample holding mechanism 140 that moves positions in the X, Y, and Z directions of a container 142 containing the liquid biological object LO, a light receiving sensor 150 that receives a detected laser beam output from the liquid biological object LO, and a control unit 160 that controls operations of respective components.

For the laser oscillator 110, such a light source is applied that outputs a suitable wavelength (for example, a wavelength resulting in high absorption efficiency or the like) in detecting a measuring target substance (see the reference MM and the like in FIG. 5C described later) contained in the liquid biological object LO. As an example thereof, as illustrated in FIG. 2, the laser oscillator 110 includes an oscillation control unit 112 that performs control to oscillate the pulsed laser beam LB at a constant cycle T based on an oscillation signal from the control unit 160, a drive power source 113 that supplies drive power to a plurality of laser sources 115a, 115b in response to an ON/OFF signal from the oscillation control unit 112, a support part 114 to which the laser sources 115a, 115b are attached, a condenser lens 116 that focuses the pulsed laser beam LB emitted from the plurality of laser sources 115a, 115b, a wavelength adjustment unit 117 that adjusts the wavelength of the emitted pulsed laser beam LB, and a transmission path 118 (for example, an optical fiber) that transmits the focused pulsed laser beam LB to the irradiation mechanism 120.

In the biological information detection device 100 according to the first embodiment, "blood" can be an example of the liquid biological object LO, and a "lactic acid" or a "lactate" can be an example of a representative measuring target substance contained in the liquid biological object LO. Herein, for example, 1480 nm is employed for a suitable wavelength of the pulsed laser beam LB in detecting a lactic acid or a lactate.

To selectively emit a wavelength (1480 nm) suitable for detecting lactic acids or lactates described above to the liquid biological object LO, arrayed light emitting diodes (LED) or semiconductor laser devices (LD) can be employed, or laser oscillated with millimeter waves, submillimeter waves, or microwaves, or free electron laser or the like can be employed for the plurality of laser sources 115a, 115b. Further, the pulsed laser beam LB formed by coaxially focusing these laser beams to increase power is transmitted through the wavelength adjustment unit 117, and thereby the pulsed laser beam LB selected into a predetermined suitable wavelength range is emitted to the transmission path 118. Herein, as the wavelength adjustment unit 117, a bandpass filter or the like for selectively removing light whose wavelength is outside a range between predetermined upper limit value and lower limit value can be illustrated as examples.

Note that, although the case where two light sources are arranged as the plurality of laser source 115a, 115b is illustrated as an example in the configuration illustrated in FIG. 2, a greater number of (three or more) laser sources may be arranged in an array or on a circular circumference. Further, although the case where drive power is directly supplied from the drive power source 113 to the plurality of laser sources 115a, 115b is illustrated, an amplifier circuit (not illustrated) may be provided to the support part 114, for example, and the drive power from the drive power source 113 may be amplified before supplied to the laser sources 115a, 115b.

In the irradiation mechanism 120, as an example thereof, the pulsed laser beam LB is introduced from one end (upper end) side via the transmission path 118, reshaped into a beam profile having a predetermined beam diameter, beam sectional shape, and the like by an internally arranged condenser lens (not illustrated), and then emitted from the other end (bottom end) side toward the liquid biological object LO contained in the container 142. Note that, although the case where the pulsed laser beam LB is reshaped so that the beam spot has a circular cross section has been illustrated as an example in the first embodiment, the beam profile can be reshaped into any shape such as a polygonal or linear shape with suitable selection of the condenser lens.

The transport mechanism 130 is configured as a linear drive body as an example thereof that moves relatively in three axis directions of X, Y, and Z orthogonal to each other, and the irradiation mechanism 120 is attached to one end of the transport mechanism 130. Note that the transport mechanism 130 may be configured as a six-axis or seven-axis type industrial robot having a robot arm whose one end has the irradiation mechanism 120 attached thereto.

The sample holding mechanism 140 is configured as a table as an example thereof that is movable in the three axis directions of X, Y, and Z shown in the figure while the container 142, which contains the liquid biological object LO containing the measuring target substance, is placed on the upper surface. Further, the light receiving sensor 150 to detect a transmitted beam from the liquid biological object LO is arranged between the upper surface of the sample holding mechanism 140 and the back surface of the container 142.

Note that the container 142 containing the liquid biological object LO is made of a material that is transparent to the wavelength of the pulsed laser beam LB described above (that is, through which the pulsed laser beam LB on irradiation transmits). Accordingly, the pulsed laser beam with which the liquid biological object LO contained in the container 142 is irradiated directly transmits through the bottom surface of the container 142 in a region where no measuring target substance exists and then reaches the light receiving sensor 150, and this irradiation is thus detected by the light receiving sensor 150.

As illustrated in FIG. 3, the control unit 160 includes, as an example thereof, a main control unit 162 that outputs operation instructions to respective components of the biological information detection device 100, a quantity calculation unit 164 that calculates the quantity of a measuring target substance contained in the liquid biological object LO by using a detected value from a light receiving sensor, a display unit 166 that displays the calculated quantity of the measuring target substance, other various parameters, or the like, and an input interface 168 that enables manual input of information for correcting various parameters such as measurement conditions. Further, in the control unit 160, the main control unit 162 is connected to the laser oscillator 110, the transport mechanism 130, and the sample holding mechanism 140 via a wired or wireless connection and transfers signals to and from these peripherals to control the operation of the entire biological information detection device 100.

The main control unit 162 has, as an example thereof, a function of, in response to a start signal Ss corresponding to start of measurement being input via the input interface 168 from the user, extracting operation information on oscillation for the laser oscillator 110, operation information on relative motion for the transport mechanism 130 and the sample holding mechanism 140, or the like provided from a predetermined measurement program and then generating and outputting an oscillation signal So or a relative motion signal Sm used for implementing the above operations to respective components. Further, the main control unit 162 also has a function of outputting the oscillation signal So to the quantity calculation unit 164 described later in synchronization with the output to the laser oscillator 110 and, in response to a calculation result from the quantity calculation unit 164, transmitting the calculation result of the quantity or the current various parameters of the biological information detection device 100 to the display unit 166 to cause them to be displayed.

The quantity calculation unit 164 has a function of, in response to receiving a calculation signal Se corresponding to start of calculation from the main control unit 162 that has received the start signal described above, continuously receiving and accumulating a detected signal Sd corresponding to a detected value at time t from the light receiving sensor 150. Further, the quantity calculation unit 164 also has a function of receiving the oscillation signal So from the main control unit 162, cutting time segment data D associated with an oscillation timing of the laser oscillator 110 out from time-series data of the detected signal Sd detected by the light receiving sensor 150, and calculating the quantity of a measuring target substance contained in the liquid biological object LO based on the time segment data D. The calculated quantity of the measuring target substance is then transmitted to the main control unit 162.

Next, a specific operation form of the biological information detection method performed by the biological information detection device according to the first embodiment will be described with reference to FIG. 4 to FIG. 6.

Figure 5A:
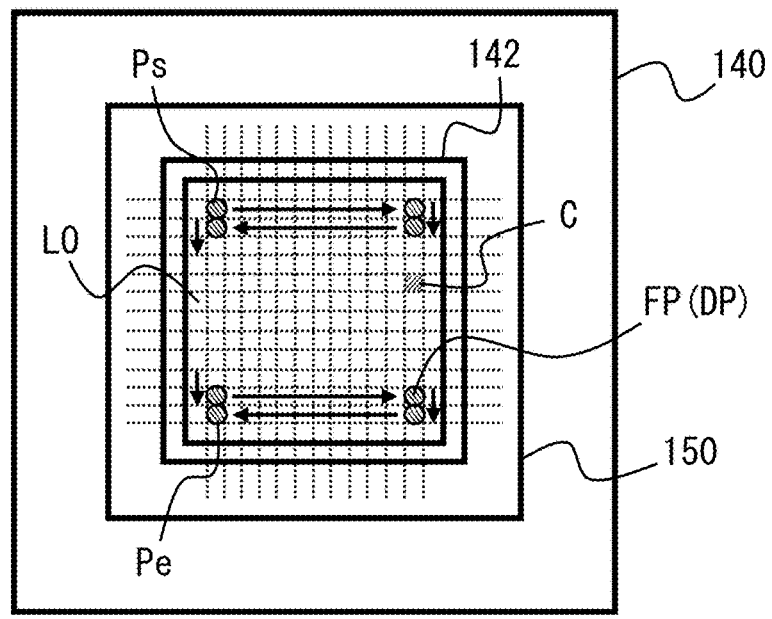
FIG. 5A is a plan view illustrating an overview of an operation procedure in which a liquid biological object is irradiated with a pulsed laser beam in the biological information detection device according to the first embodiment.
Figure 5B:
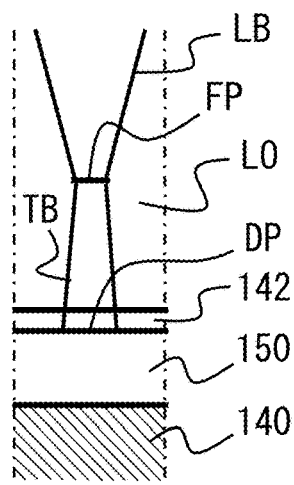
FIG. 5B is a partial front view illustrating an overview of an operation procedure in which the liquid biological object is irradiated with a pulsed laser beam in the biological information detection device according to the first embodiment.
Figure 5C:
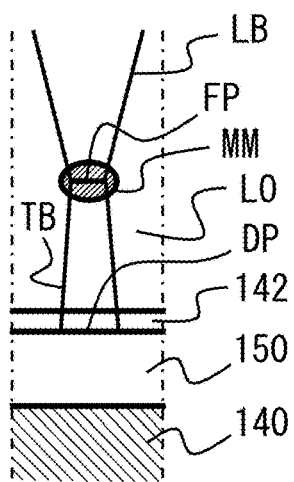
FIG. 5C is a partial front view illustrating an overview of an operation procedure in which the liquid biological object is irradiated with a pulsed laser beam in the biological information detection device according to the first embodiment.

FIG. 4 is a flowchart illustrating the overview of the biological information detection method according to the first embodiment. Further, FIG. 5A is a plan view illustrating the overview of an operation procedure in which a liquid biological object is irradiated with a pulsed laser beam in the biological information detection device according to the first embodiment. Further, FIG. 5B and FIG. 5C are partial front views each illustrating the overview of an operation procedure in which the liquid biological object is irradiated with a pulsed laser beam in the biological information detection device according to the first embodiment. Furthermore, FIG. 6 is a time-series graph illustrating the relationship between various instruction signals and measurement data.

In the biological information detection method performed by the biological information detection device 100 according to the first embodiment, as illustrated in FIG. 4, in response to the start signal Ss corresponding to start of measurement being input via the input interface 168 from the user, the main control unit 162 of the control unit 160 first instructs the quantity calculation unit 164 to start receiving the detected signal Sd from the light receiving sensor 150 (step S101). Accordingly, in the quantity calculation unit 164, the detected signal Sd from the light receiving sensor 150 is continuously received and temporarily stored as time-series data until the end of the operation indicated by the flowchart.

Subsequently, the main control unit 162 outputs the relative motion signal Sm to the transport mechanism 130 and the sample holding mechanism 140 based on a predetermined measurement program (step S102). Accordingly, the position and the focus distance applied when the liquid biological object LO is irradiated with the pulsed laser beam LB are positioned.

Next, the main control unit 162 outputs, to the laser oscillator 110, the oscillation signal So to emit the pulsed laser beam LB for a defined irradiation time period Ton (step S103). In the laser oscillator 110 that has received the oscillation signal So, the oscillation control unit 112 outputs an ON-instruction signal Son during the irradiation time period Ton described above to the drive power source 113, and the pulsed laser beam LB adjusted at a predetermined wavelength is emitted.

Subsequently, the main control unit 162 determines based on the above measurement program whether or not emission of the pulsed laser beam LB for all the measurement ranges defined for the liquid biological object LO in the container 142 is completed (step S104). That is, if it is determined in step S104 that the irradiation for all the measurement ranges is completed, the main control unit 162 outputs the calculation signal Se to the quantity calculation unit 164 indicating the completion of measurement on the liquid biological object LO and proceeds to the subsequent step S105.

In contrast, if it is determined in step S104 that the irradiation in all the measurement ranges is not completed, the process returns to step S102, and positioning and emission of the pulsed laser beam LB for uncompleted measurement range are repeatedly performed in accordance with the measurement program. Accordingly, detection of the measuring target substance is performed for all the ranges (regions) where the liquid biological object LO contained in the container 142 is to be measured.

Reference is now made on FIG. 5A to FIG. 5C, and a specific example is illustrated for each operation procedure from step S102 to step S104 described above. That is, as illustrated in FIG. 5A, the liquid biological object LO is contained in the container 142 placed on the light receiving sensor 150 having a sensing surface on the upper side, and a plurality of rectangular regions C having a vertical and horizontal lengths corresponding to the focus diameter (spot diameter) of a focus point FP of the pulsed laser beam LB are defined in the liquid biological object LO.

Further, for the plurality of rectangular regions defined as described above, an irradiation start position Ps and an irradiation end position Pe of the pulsed laser beam LB are further defined by the measurement program, and a scan path for scanning a part between the irradiation start position Ps and the irradiation end position Pe in the XY direction is defined. Note that, in the determination in step S104 of the flowchart illustrated in FIG. 4, the determination is made in accordance with whether or not the current irradiation position (focus point FP) matches the irradiation end position Pe on the scan path.

Next, the relationship between the presence or absence of the measuring target substance MM and a detected signal from the light receiving sensor 150 at an irradiation position (focus point FP) of the pulsed laser beam LB will be described below. For example, as illustrated in FIG. 5B, when the measuring target substance MM does not exist at the focus point FP of the pulsed laser beam LB on irradiation or on the extension line therefrom, since the pulsed laser beam LB transmits through the liquid biological object LO and the container 142, a transmitted beam TB corresponding to the power of the emitted pulsed laser beam LB is detected at a light receiving point DP of the light receiving sensor 150.

In contrast, as illustrated in FIG. 5C, when the measuring target substance MM exists at the focus point FP of the pulsed laser beam LB on irradiation or on the extension line therefrom, since the pulsed laser beam LB is absorbed or reflected by the measuring target substance MM, a transmitted beam TB having power lower than the power of the emitted pulsed laser beam LB is detected at the light receiving point DP of the light receiving sensor 150. Note that, although the case where the measuring target substance MM is larger than the focus diameter at the focus point FP of the pulsed laser beam LB is illustrated as an example in FIG. 5C, the same tendency is exhibited even when the measuring target substance MM is smaller than the focus diameter.

Figure 6:
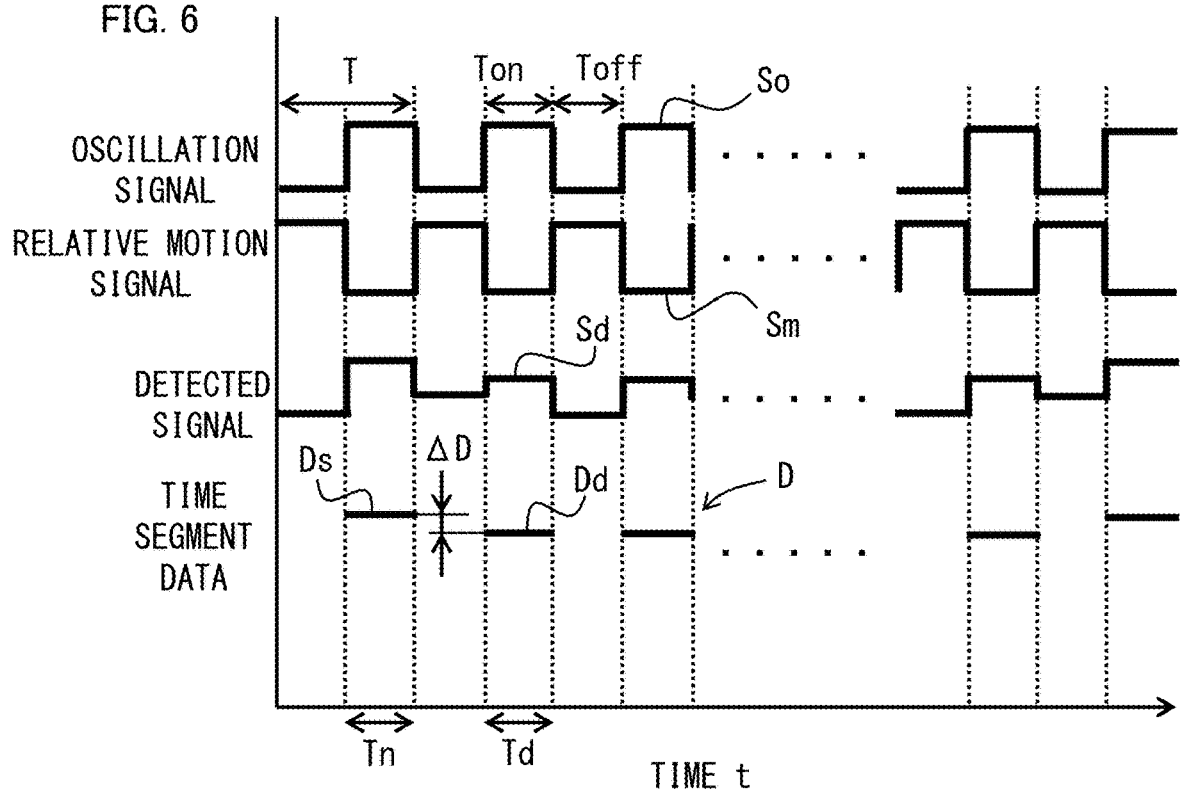
FIG. 6 is a time-series graph illustrating a relationship between various instruction signals and measurement data.

Subsequently, as illustrated in FIG. 6, the quantity calculation unit 164 that has received the calculation signal from the main control unit 162 cuts out a time segment of the detected signal Sd received from the light receiving sensor 150 corresponding to a time segment in which the oscillation signal So has been received from the main control unit 162 and thereby extracts the time segment data D (step S105). Accordingly, it is possible to refine data to only the data on the time segment corresponding to the irradiation time period Ton during which the pulsed laser beam LB has been emitted for the detected signal Sd (that is, it is possible to reduce noise during detection). Herein, a sum of an irradiation time period Ton and a non-irradiation time period Toff of the oscillation signal So is defined as one cycle T.

Next, the quantity calculation unit 164 calculates the quantity of the measuring target substance MM to the liquid biological object LO based on the extracted time segment data D. Specifically, the time segment data D extracted in step S105 includes, as an example thereof, two levels of output values, namely, reference data Ds (the state illustrated in FIG. 5B) when the measuring target substance MM is not detected (a non-detection time segment Tn) and detection data Dd (the state illustrated in FIG. 5C) when the measuring target substance MM is detected (a detection time segment Td).

Herein, it can be determined that the larger the absolute value of a difference ΔD between the reference data Ds and the detection data Dd is, the greater the detected amount of the measuring target substance MM is. Accordingly, after the measurement for all the measurement ranges of interest, the quantity calculation unit 164 accumulates the number of detection data Dd in the entire time segment data D, outputs the accumulated number to the main control unit 162 as the "quantity" of the measuring target substance MM, and ends the operation (step S106).

Note that the quantity of the measuring target substance MM may be calculated as a ratio relative to the total, instead of the accumulated number. Further, a predetermined threshold may be provided for the difference ΔD between the reference data Ds and the detection data Dd, and an instance that exceeds the predetermined threshold may be determined as "detected".

With the configuration as described above, the biological information detection device and the biological information detection method according to the first embodiment are configured to output an oscillation instruction to a laser oscillator so as to oscillate pulsed laser beam at a constant cycle, cut out a detected signal received from a light receiving sensor as time segment data in the time period corresponding to the constant cycle, and calculate the quantity of a measuring target substance in a liquid biological object based on the time segment data. Thus, measurement data on the measuring target substance contained in the liquid biological object can be acquired noninvasively with low noise.

Second Embodiment

Next, an embodiment of a biological information detection device and a biological information detection method according to a second embodiment that is another example of the present invention will be described with reference to FIG. 7A to FIG. 8. Note that, in the second embodiment, components that may employ features identical or common to those of the first embodiment in the schematic diagrams or the like illustrated in FIG. 1 to FIG. 6 are labeled with the same references, and the repeated description thereof will be omitted.

Figure 7A:
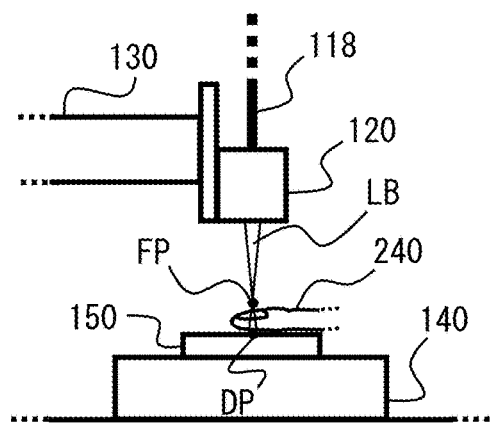
FIG. 7A is a plan view illustrating an overview of an operation procedure in which a liquid biological object is irradiated with a pulsed laser beam in a biological information detection device according to a second embodiment.
Figure 7B:
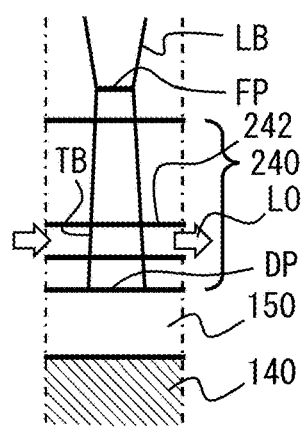
FIG. 7B is a partial front view illustrating an overview of an operation procedure in which the liquid biological object is irradiated with a pulsed laser beam in the biological information detection device according to the second embodiment.
Figure 7C:
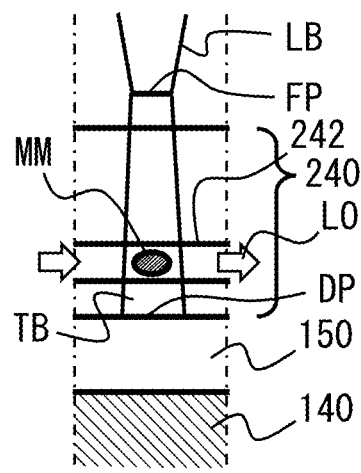
FIG. 7C is a partial front view illustrating an overview of an operation procedure in which the liquid biological object is irradiated with a pulsed laser beam in the biological information detection device according to the second embodiment.

FIG. 7A is a plan view illustrating the overview of an operation procedure in which a liquid biological object is irradiated with a pulsed laser beam in the biological information detection device according to the second embodiment. Further, FIG. 7B and FIG. 7C are partial front views each illustrating the overview of an operation procedure in which the liquid biological object is irradiated with a pulsed laser beam in the biological information detection device according to the second embodiment. Furthermore, FIG. 8 is a flowchart illustrating the overview of the biological information detection method according to the second embodiment.

The biological information detection device 100 according to the second embodiment uses the scheme to irradiate a blood vessel or the like with the pulsed laser beam LB for direct measurement and perform measurement while blood, which is a representative example of the liquid biological object LO, flows inside an organism such as a human, for example, in contrast to the measuring scheme using the container 142 containing the liquid biological object LO in the first embodiment. That is, as illustrated in FIG. 7A, a terminal part of a human body (for example, a finger 240) through which the irradiated pulsed laser beam LB is relatively easily to transmit is placed on the light receiving sensor 150 having a sensing surface on the upper side, and in this state, the pulsed laser beam LB is emitted toward the finger 240.

Herein, at the irradiation position (focus point FP) of the pulsed laser beam LB, as illustrated in FIG. 7B, for example, when the measuring target substance MM does not exist at the focus point FP of the pulsed laser beam LB on irradiation or on the extension line therefrom, since the pulsed laser beam LB transmits through the finger 240 including the blood vessel 242, the transmitted beam TB corresponding to the power of the emitted pulsed laser beam LB is detected at a light receiving point DP of the light receiving sensor 150.

In contrast, as illustrated in FIG. 7C, when the measuring target substance MM exists at the focus point FP of the pulsed laser beam LB irradiated or on the extension line therefrom, since the pulsed laser beam LB is absorbed or reflected by the measuring target substance MM, a transmitted beam TB having power lower than the power of the emitted pulsed laser beam LB is detected at the light receiving point DP of the light receiving sensor 150. Note that, also in FIG. 7C, the same tendency is exhibited even when the measuring target substance MM is smaller than the focus diameter of the focus point FP of the pulsed laser beam LB in the same manner as in the case of the first embodiment.

In the state of such arrangement, while the pulsed laser beam LB in accordance with ON/OFF control at the constant cycle T is being emitted for a predetermined time period, the detected signal Sd from the light receiving sensor 150 is received. Accordingly, instead of scanning and measuring a measurement region of the liquid biological object LO in the container 142 in the first embodiment, it is possible to measure time-series data on the liquid biological object LO that is blood flowing continuously.

Figure 8:
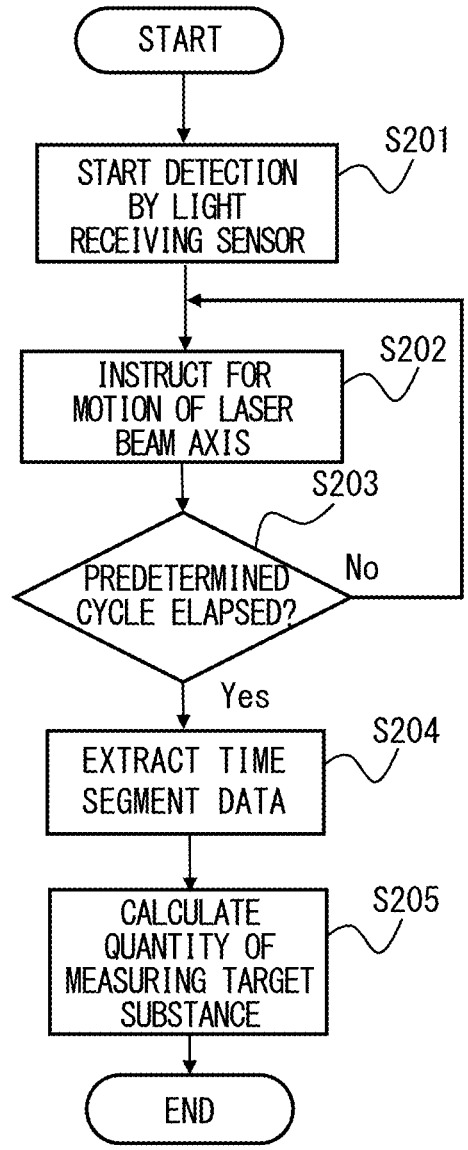
FIG. 8 is a flowchart illustrating an overview of a biological information detection method according to the second embodiment.

In the biological information detection method according to the second embodiment, as illustrated in FIG. 8, in response to the start signal Ss corresponding to start of measurement being input via the input interface 168 from the user, the main control unit 162 of the control unit 160 first instructs the quantity calculation unit 164 to start receiving the detected signal Sd from the light receiving sensor 150 (step S201). Accordingly, in the quantity calculation unit 164, the detected signal Sd from the light receiving sensor 150 is continuously received and temporarily stored as time-series data until the end of the operation indicated by the flowchart.

Subsequently, the main control unit 162 outputs, to the laser oscillator 110, the oscillation signal So to emit the pulsed laser beam LB for a defined irradiation time period Ton based on a predetermined measurement program (step S202). In the laser oscillator 110 that has received the oscillation signal So, in the same manner as in the first embodiment, the oscillation control unit 112 outputs an ON-instruction signal Son to the drive power source 113 for the irradiation time period Ton described above, and the pulsed laser beam LB adjusted at a predetermined wavelength is emitted.

Subsequently, the main control unit 162 determines based on the above measurement program whether or not the emission of the pulsed laser beam LB at the constant cycle T is completed for predetermined cycles (step S203). That is, if it is determined in step S203 that the emission of a predetermined number of cycles is completed, the main control unit 162 outputs the calculation signal Se to the quantity calculation unit 164 indicating the completion of measurement on the liquid biological object LO and proceeds to the subsequent step S204.

In contrast, if it is determined in step S203 that the emission of a predetermined number of cycles is not completed, the process returns to step S202, and emission of the pulsed laser beam LB for one cycle is repeated. Accordingly, the detection operation on the measuring target substance is performed over a predetermined time period for the liquid biological object (blood) LO flowing continuously in the blood vessel 242 of the finger 240.

Subsequently, in the same manner as in the first embodiment, the quantity calculation unit 164 that has received the calculation signal from the main control unit 162 cuts out a time segment of the detected signal Sd received from the light receiving sensor 150 corresponding to a time segment in which the oscillation signal So has been received from the main control unit 162 and thereby extracts the time segment data D (step S204). Accordingly, it is possible to refine data to only the data on the time segment corresponding to the irradiation time period Ton during which the pulsed laser beam LB has been emitted for the detected signal Sd.

Next, the quantity calculation unit 164 calculates the quantity the measuring target substance MM to the liquid biological object LO based on the extracted time segment data D in the same manner as in the case of the first embodiment. Accordingly, after the measurement of time-series data with a predetermined number of cycles, the quantity calculation unit 164 accumulates the number of detection data Dd in the entire time segment data D, outputs the accumulated number to the main control unit 162 as the "quantity" of the measuring target substance MM, and ends the operation (step S205).

With the configuration as described above, the biological information detection device and the biological information detection method according to the second embodiment use the scheme to irradiate a blood vessel of a finger or the like with a pulsed laser beam for direct measurement and perform measurement while blood, which is a representative example of the liquid biological object, flows inside an organism such as a human, for example. Thus, in addition that the advantageous effects described in the first embodiment can be obtained, it is not required to acquire a liquid biological object containing a measuring target substance in advance from a human body or the like, and this can reduce the burden during measurement. Further, since the step of relatively moving the pulsed laser beam with respect to the container containing the liquid biological object LO to be measured is not required, the overall measuring time can also be shortened.

Third Embodiment

Next, an embodiment of a biological information detection device and a biological information detection method according to a third embodiment that is yet another example of the present invention will be described with reference to FIG. 9A to FIG. 11. Note that, in the third embodiment, components that may employ features identical or common to those of the first embodiment and the second embodiment in the schematic diagrams or the like illustrated in FIG. 1 to FIG. 8 are labeled with the same references, and the repeated description thereof will be omitted.

Figure 9A:
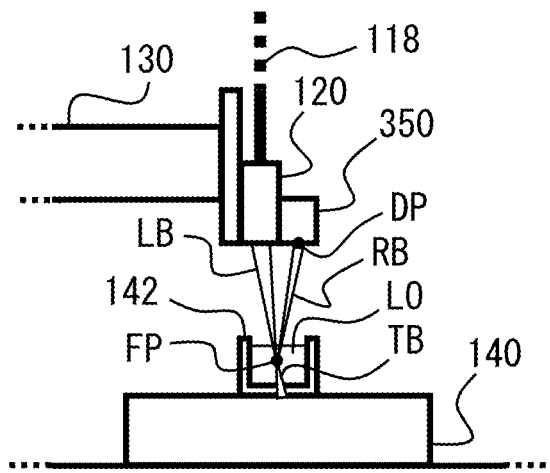
FIG. 9A is a plan view illustrating an overview of an operation procedure in which a liquid biological object is irradiated with a pulsed laser beam in a biological information detection device according to a third embodiment.
Figure 9B:
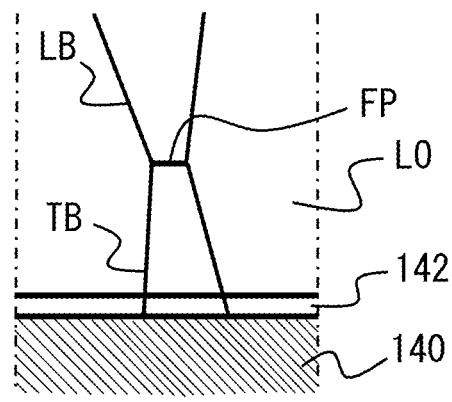
FIG. 9B is a partial front view illustrating an overview of an operation procedure in which the liquid biological object is irradiated with a pulsed laser beam in the biological information detection device according to the third embodiment.
Figure 9C:
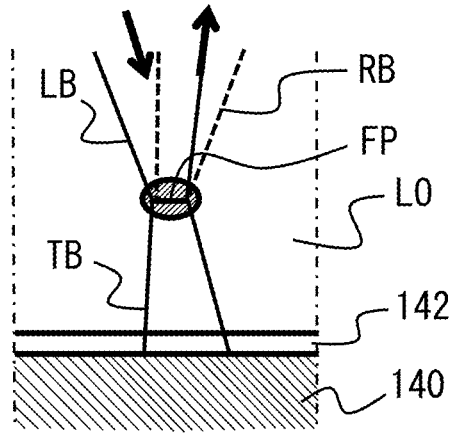
FIG. 9C is a partial front view illustrating an overview of an operation procedure in which the liquid biological object is irradiated with a pulsed laser beam in the biological information detection device according to the third embodiment.
Figure 10:
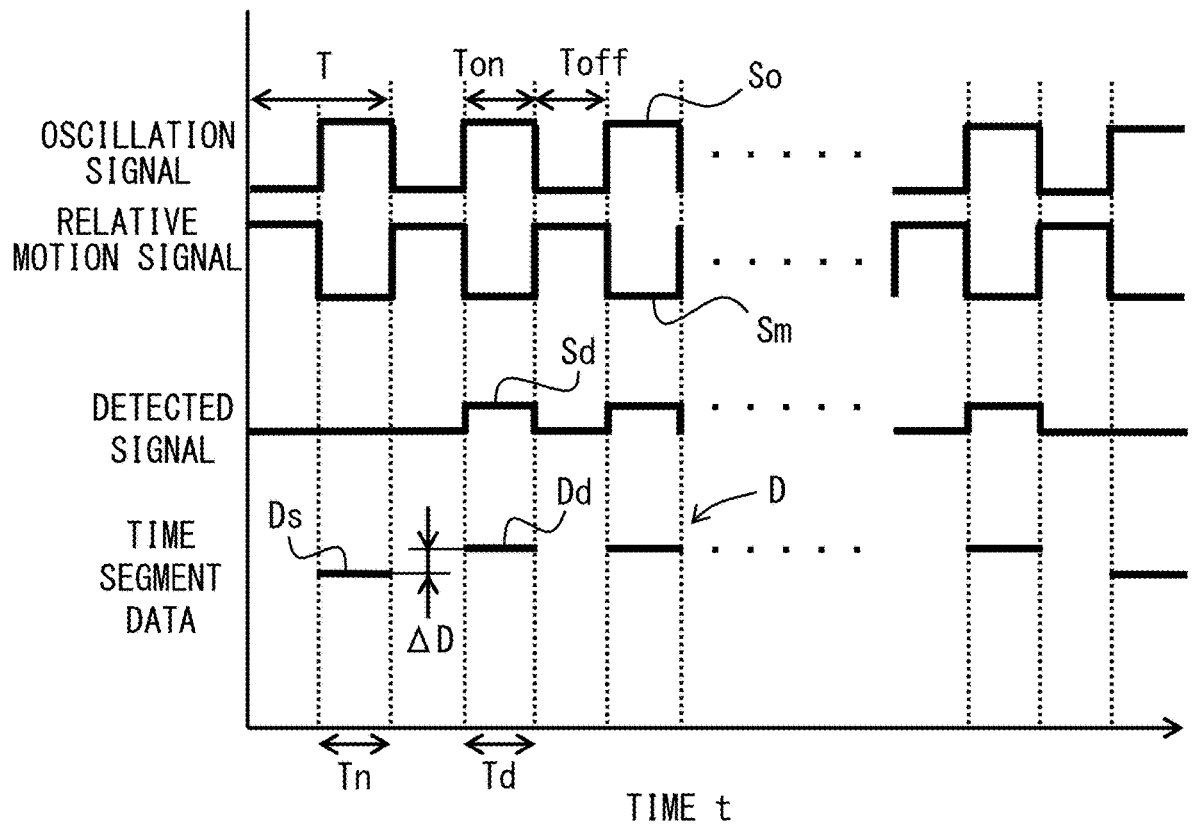
FIG. 10 is a time-series graph illustrating a relationship between various instruction signals and measurement data.
Figure 11:
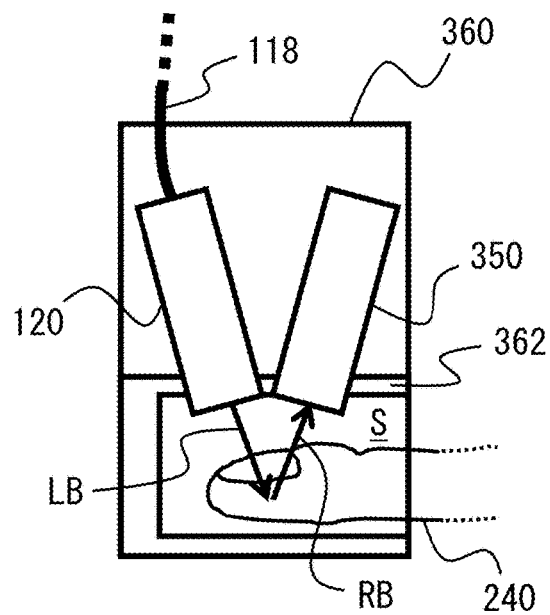
FIG. 11 is a partial sectional view illustrating an overview of a measuring unit according to a modified example for the biological information detection device according to the third embodiment.

FIG. 9A is a plan view illustrating the overview of an operation procedure in which a liquid biological object is irradiated with a pulsed laser beam in the biological information detection device according to the third embodiment. Further, FIG. 9B and FIG. 9C are partial front views each illustrating the overview of an operation procedure in which the liquid biological object is irradiated with a pulsed laser beam in the biological information detection device according to the third embodiment. Further, FIG. 10 is a time-series graph illustrating a relationship between various instruction signals and measurement data. Furthermore, FIG. 11 is a partial sectional view illustrating the overview of a measuring unit according to a modified example for the biological information detection device according to the third embodiment.

The biological information detection device 100 according to the third embodiment uses a scheme to measure a reflected beam from the measuring target substance MM contained in the liquid biological object LO in contrast to the measuring scheme to detect a transmitted beam from the liquid biological object LO by using the light receiving sensor 150 in the first embodiment. That is, as illustrated in FIG. 9A, the liquid biological object LO is contained in the container 142 placed on the sample holding mechanism 140, and the pulsed laser beam LB is emitted to a predetermined measuring range of the liquid biological object LO in the same manner as in the case of the first embodiment.

Herein, in the biological information detection device 100 according to the third embodiment, a reflected beam RB reflected by the measuring target substance MM contained in the liquid biological object LO is detected by the light receiving sensor 350 attached to the irradiation mechanism 120. That is, as illustrated in FIG. 9B, for example, when the measuring target substance MM does not exist at the focus point FP of the pulsed laser beam LB on irradiation or on the extension line therefrom, since the pulsed laser beam LB transmits through the liquid biological object LO and the container 142, only the detected value based on the amount of light around the device is detected by the light receiving sensor 350.

In contrast, as illustrated in FIG. 9C, when the measuring target substance MM exists at the focus point FP of the pulsed laser beam LB irradiated or on the extension line therefrom, since the pulsed laser beam LB is absorbed or reflected by the measuring target substance MM, the reflected beam RB resulted from partial reflection of the output of the irradiated pulsed laser beam LB is detected at the light receiving point DP of the light receiving sensor 350. Note that, in FIG. 9C, the same tendency is exhibited even when the measuring target substance MM is smaller than the focus diameter of the focus point FP of the pulsed laser beam LB in the same manner as in the case of the first embodiment.

In the biological information detection device 100 according to the third embodiment, as illustrated in FIG. 10, the detected signal Sd that gives the largest detected value in a time segment in which the light receiving sensor 350 has detected the reflected beam RB is received. The quantity calculation unit 164 then cuts out the time segment of the detected signal Sd received from the light receiving sensor 150 that corresponds to the time segment in which the oscillation signal So has been received from the main control unit 162 and thereby extracts the time segment data D. Accordingly, in the same manner as in the case of the first embodiment, it is possible to refine data to only the data on the time segment corresponding to the irradiation time period Ton during which the pulsed laser beam LB has been emitted for the detected signal Sd.

Next, the quantity calculation unit 164 calculates the quantity of the measuring target substance MM to the liquid biological object LO based on the extracted time segment data D. Specifically, the extracted time segment data D includes, as an example thereof, two levels of output values, namely, the reference data Ds (the non-detection time segment Tn) when the measuring target substance MM is not detected and the detection data Dd (the detection time segment Td) when the measuring target substance MM is detected.

Herein, in the same manner as in the case of the first embodiment, it can be determined that the larger the absolute value of a difference ΔD between the reference data Ds and the detection data Dd is, the greater the detected amount of the measuring target substance MM is. Accordingly, after the measurement for all the measurement ranges of interest, the quantity calculation unit 164 accumulates the number of detection data Dd in the entire time segment data D and outputs the accumulated result to the main control unit 162 as the "quantity" of the measuring target substance MM.

As described above, the biological information detection device 100 according to the third embodiment detects the reflected beam RB of the pulsed laser beam LB for the measuring target substance MM and thereby calculates the quantity of this measuring target substance MM. Thus, as a modified example for the third embodiment, it is possible to employ a configuration of a measuring unit with a more compact size.

That is, as illustrated in FIG. 11, as a measuring unit 360, a configuration including a cylindrical housing part 362 that contains a part of an organism in which the liquid biological object LO flows, such as the finger 240, for example, the irradiation mechanism 120 that emits the pulsed laser beam LB toward the internal space S of the housing part 362, and the light receiving sensor 350 that detects a reflected beam of the pulsed laser beam LB can be indicated as an example. Since this can minimize the detection of the amount of light that may be caused by a surrounding environment of the measuring unit 360, the measurement accuracy can be further increased.

With the configuration as described above, in addition that the advantageous effects described in the first embodiment can be obtained, the biological information detection device and the biological information detection method according to the third embodiment can minimize the detection of the amount of light that may be caused by the surrounding environment and therefore further increase the measuring accuracy by using a scheme to measure a reflected light from a measuring target substance contained in a liquid biological object.

Fourth Embodiment

Next, an embodiment of a biological information detection device and a biological information detection method according to a fourth embodiment that is yet another example of the present invention will be described with reference to FIG. 12 to FIG. 14. Note that, in the fourth embodiment, components that may employ features identical or common to those of the first to third embodiments in the schematic diagrams or the like illustrated in FIG. 1 to FIG. 11 are labeled with the same references, and the repeated description thereof will be omitted.

Figure 12:
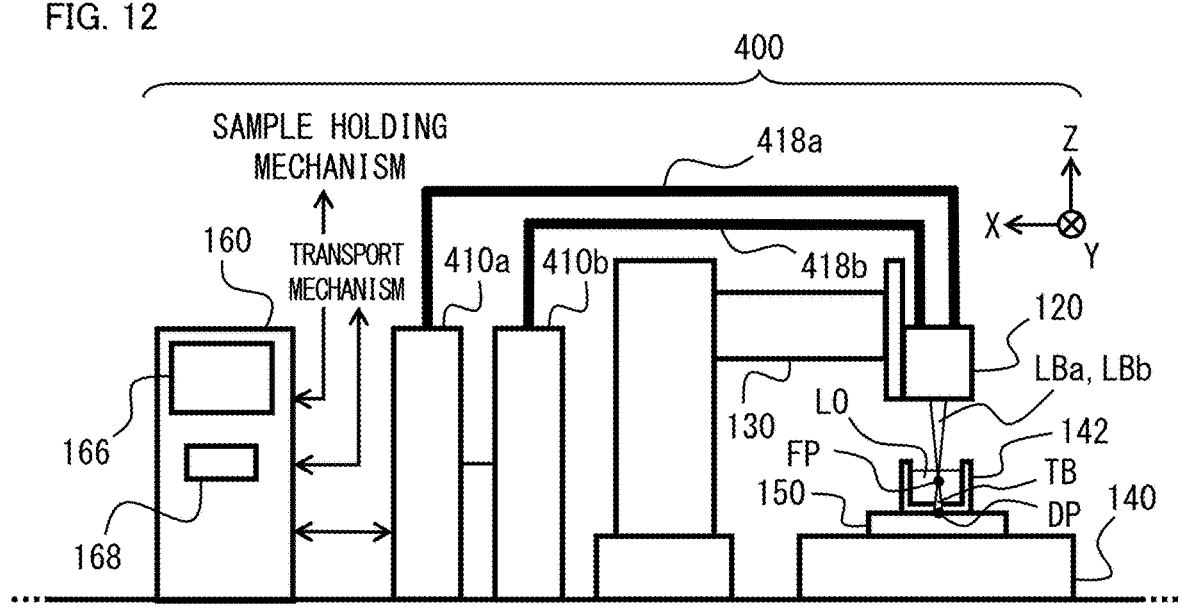
FIG. 12 is a schematic diagram illustrating a configuration of a biological information detection device according to a fourth embodiment.

FIG. 12 is a schematic diagram illustrating a configuration of a biological information detection device according to the fourth embodiment. Further, FIG. 13 is a time-series graph illustrating a relationship between various instruction signals and measurement data. Further, FIG. 14 is a block diagram illustrating an example of a configuration of a laser oscillator included in the biological information detection device illustrated in FIG. 12.

A biological information detection device 400 according to the fourth embodiment differs from the first embodiment in having a plurality of laser oscillators 410*a*, 410*b* that output pulsed laser beams LBa, LBb set at different suitable wavelengths associated with different measuring target substances. This enables the biological information detection device 400 according to the fourth embodiment to obtain quantities associated with a plurality of measuring target substances MM1, MM2 from a single liquid biological object LO.

Specifically, as illustrated in FIG. 12, the biological information detection device 400 according to the fourth embodiment includes a laser oscillator 410*a* that oscillates the pulsed laser beam LBa oscillated at a suitable wavelength associated with a first measuring target substance, a laser oscillator 410*b* that oscillates the pulsed laser beam LBb oscillated at a suitable wavelength associated with a second measuring target substance, the irradiation mechanism 120 that emits the pulsed laser beams LBa, LBb to the liquid biological object LO inside which the first measuring target substance and the second measuring target substance exist, the transport mechanism 130 that moves positions in the X, Y, and Z directions of the irradiation mechanism 120, the sample holding mechanism 140 that moves positions in the X, Y, and Z directions of the container 142 containing the liquid biological object LO, the light receiving sensor 150 that receives the detected laser beam output from the liquid biological object LO, and the control unit 160 that controls operations of respective components.

In the biological information detection device 400 according embodiment, a "lactic acid" or a "lactate" can be indicated as an example as the first measuring target substance MM1 contained in the liquid biological object LO. Herein, as the suitable wavelength of the pulsed laser beam LBa in detecting the lactic acid or the lactate, for example, 1480 nm is employed in the same manner as in the case of the first embodiment.

On the other hand, as the second measuring target substance MM2 contained in the liquid biological object LO, a "pyruvic acid" can be indicated as an example. Herein, as the suitable wavelength of the pulsed laser beam LBb in detecting the pyruvic acid, for example, 1462 nm is employed.

The pulsed laser beams LBa, LBb output from the laser oscillators 410a, 410b are introduced from one end (upper end) side of the irradiation mechanism 120 via the transmission paths 418a, 418b, respectively. Then, after reshaped into a coaxial beam profile by focusing optics (not illustrated) arranged inside the irradiation mechanism 120, the pulsed laser beams LBa, LBb are emitted toward the liquid biological object LO contained in the container 142 from the other end (bottom end) side. Note that, also in the fourth embodiment, the beam spots of the pulsed laser beams LBa, LBb can be reshaped into a beam profile having any shape such as a polygonal or linear shape.

Figure 13:
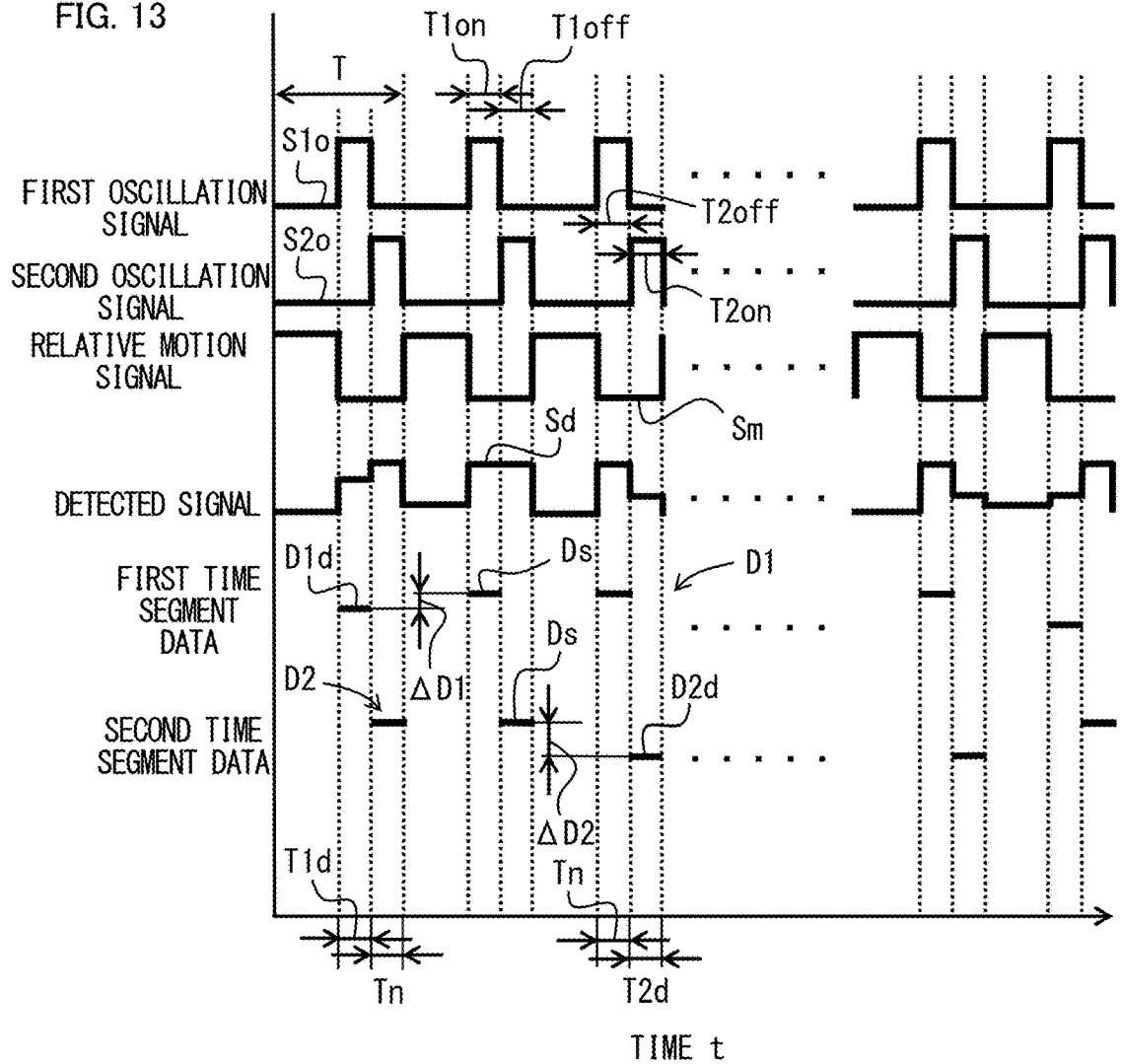
FIG. 13 is a time-series graph illustrating a relationship between various instruction signals and measurement data.

The relationship between the detected signal Sd at the light receiving sensor 150 obtained by such a configuration and various signals takes a form including a first detection time segment T1d and the second detection time segment T2d corresponding to two oscillation signals S1o, S2o, as illustrated in FIG. 13 as an example thereof. Further, in the same manner as in the first embodiment, the quantity calculation unit 164 that has received a calculation signal from the main control unit 162 cuts out a time segment of the detected signal Sd corresponding to a time segment in which the oscillation signal S1o is received and a time segment of the detected signal Sd corresponding to a time segment in which the oscillation signal S2o is received, and thereby extracts the first time segment data D1 and the second time segment data D2. Accordingly, it is possible to refine data to only the data on the time segment corresponding to the irradiation time period T1on during which the first pulsed laser beam LB1 has been emitted and the irradiation time period T2on during which the second pulsed laser beam LB2 has been emitted.

Next, the quantity calculation unit 164 calculates quantities associated with the liquid biological object LO of the measuring target substances MM1 and MM2 based on the extracted first time segment data D1 and second time segment data D2. Specifically, the extracted first time segment data D1 and second time segment data D2 include two levels of output values, namely, the reference data Ds (non-detection time segment Tn) when each measuring target substance MM1, MM2 is not detected and detection data D1d, D2d when each measuring target substance MM1, MM2 is detected, as an example thereof.

Herein, it can be determined that the larger the absolute value of a difference ΔD1 between the reference data Ds and the detection data D1d is and the larger the absolute value of a difference ΔD2 between the reference data Ds and the detection data D2d is, the greater the detected amounts of the measuring target substances MM1, MM2 are. Accordingly, after the measurement for all the measurement ranges of interest, the quantity calculation unit 164 accumulates the numbers of detection data D1d and D2d in the whole of the first time segment data D1 and the second time segment data D2 and outputs the accumulated numbers to the main control unit 162 as respective "quantities" of the measuring target substances MM1, MM2.

Note that, in the same manner as in the case of the first embodiment, the quantities of the measuring target substances MM1, MM2 may be calculated as ratios relative to the total, instead of the accumulated numbers. Further, a predetermined threshold may be set for the difference ΔD1 or ΔD2, and an instance that exceeds the predetermined threshold may be determined as "detected".

Next, a modified example for the fourth embodiment will be described with reference to FIG. 14. The biological information detection device 400 according to the modified example for the fourth embodiment includes, as an example thereof, a configuration in which the two laser oscillators 410a, 410b illustrated in FIG. 12 are replaced by a single laser oscillator 410.

Figure 14:
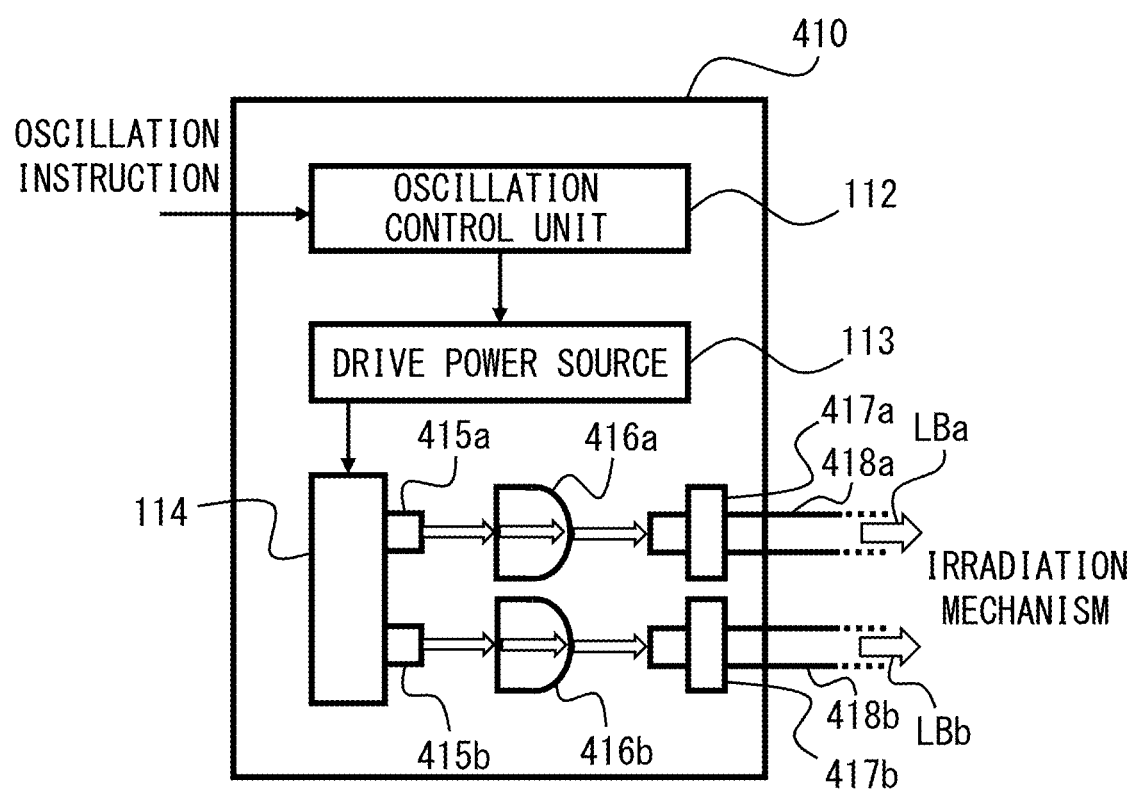
FIG. 14 is a block diagram illustrating an example of a configuration of a laser oscillator included in the biological information detection device illustrated in FIG. 12.

That is, as illustrated in FIG. 14, the laser oscillator 410 includes the oscillation control unit 112, the drive power source 113, a support part 114 to which a plurality of laser sources 415a, 415b are attached, a condenser lens 416a that focuses the pulsed laser beam LBa emitted from the laser source 415a, a condenser lens 416b that focuses the pulsed laser beam LBb emitted from the laser source 415b, wavelength adjustment units 417a, 417b that adjust wavelengths of the emitted pulsed laser beams LBa, LBb, and transmission paths 418a, 418b (for example, optical fibers) that transmit the focused pulsed laser beams LBa, LBb to the irradiation mechanism 120, respectively.

Note that, in the same manner as in the case of the first embodiment, as the plurality of laser sources 415a, 415b, a plurality of light emitting diodes (LED) or semiconductor laser devices (LD) arrayed to increase the power can be employed. Further, an amplifier circuit (not illustrated) may be separately provided, and drive power from the drive power source 113 may be amplified and supplied to the plurality of laser sources 415a, 415b. These configurations can reduce the overall space occupied by the biological information detection device 400.

Furthermore, although the case where two different pulsed laser beams LBa, LBb are used for detecting the two measuring target substances MM1, MM2 has been illustrated as an example for the biological information detection device 400 according to the fourth embodiment, pulsed laser beams with three or more different wavelengths can be applied in combination for detecting three or more measuring target substances.

With the configuration as described above, since the biological information detection device and the biological information detection method according to the fourth embodiment have the configuration that performs detection by using a plurality of laser oscillators that output pulsed laser beams set at different suitable wavelengths associated with a plurality of measuring target substances, quantities for a plurality of measuring target substances can be simultaneously obtained from a single liquid biological object, in addition that the advantageous effects described in the first embodiment can be obtained.

Note that the present invention is not limited to the embodiments described above and can be changed as appropriate within the scope not departing from the spirit of the invention. In the present invention, modification of any component in the embodiment or omission of any component in the embodiment is possible within the scope of the invention. For example, the specific examples illustrated in the first embodiment to the fourth embodiment may be applied in combination of respective features.

LIST OF REFERENCE SYMBOLS 100, 400 biological information detection device
110, 410, 410a, 410b laser oscillator
112 oscillation control unit
113 drive power source
114 support part
115a, 115b, 415a, 415b laser source
116, 416a, 416b condenser lens
117, 417a, 417b wavelength adjustment unit
118, 418a, 418b transmission path
120 irradiation mechanism
130 transport mechanism
140 sample holding mechanism
142 container
150, 350 light receiving sensor
160 control unit
162 main control unit
164 quantity calculation unit
166 display unit
168 input interface
240 finger
242 blood vessel
360 measuring unit
362 housing part

The invention claimed is:

1. A biological information detection device comprising: a laser oscillator that oscillates a pulsed laser beam oscillated at a suitable wavelength associated with a measuring target substance; an irradiation mechanism that emits the pulsed laser beam to a liquid biological object inside which the measuring target substance exists; a light receiving sensor that receives a detected laser beam output from the liquid biological object; and a control unit that controls operations of respective components,
wherein the control unit outputs an oscillation instruction to the laser oscillator so as to oscillate the pulsed laser beam at a constant cycle, cuts out a detected signal received from the light receiving sensor as time segment data for a time period corresponding to the constant cycle, and calculates a quantity of the measuring target substance in the liquid biological object based on the time segment data,
wherein the measuring target substance is a lactic acid or a lactate, and the suitable wavelength is 1480 nm.

2. The biological information detection device according to claim 1, wherein the pulsed laser beam is emitted toward the liquid biological object that is flowing.

3. The biological information detection device according to claim 1, wherein the light receiving sensor is configured to receive a reflected beam of the pulsed laser beam.

4. The biological information detection device according to claim 1,
wherein the measuring target substance comprises a plurality of measuring target substances, and
wherein the biological information detection device includes a plurality of laser oscillators for the plurality of measuring target substances, respectively.

5. A biological information detection method comprising: emitting a pulsed laser beam oscillated at a suitable wavelength associated with a measuring target substance to a liquid biological object inside which the measuring target substance exists; and receiving, by a light receiving sensor, a detected laser beam output from the liquid biological object to acquire a quantity of the measuring target substance in the liquid biological object,
wherein the pulsed laser beam is oscillated at a constant cycle, and the biological information detection method includes cutting out a detected signal received from the light receiving sensor as a time segment data for a time period corresponding to the constant cycle and calculating the quantity based on the time segment data,
wherein the measuring target substance is a lactic acid or a lactate, and the suitable wavelength is 1480 nm.

6. The biological information detection method according to claim 5, wherein the pulsed laser beam is emitted toward the liquid biological object that is flowing.

7. The biological information detection method according to claim 5, wherein a reflected beam of the pulsed laser beam is received as the detected laser beam.

8. The biological information detection method according to claim 5,
wherein the measuring target substance comprises a plurality of measuring target substances, and
wherein a plurality of pulsed laser beams are emitted for the plurality of measuring target substances, respectively.

* * * * *